(12) United States Patent
Ukai et al.

(10) Patent No.: US 9,184,455 B2
(45) Date of Patent: Nov. 10, 2015

(54) FUEL CELL SYSTEM AND METHOD OF OPERATING THE SAME

(75) Inventors: Kunihiro Ukai, Nara (JP); Tomoya Takeuchi, Shiga (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 132 days.

(21) Appl. No.: 14/240,303

(22) PCT Filed: Aug. 24, 2012

(86) PCT No.: PCT/JP2012/005320
§ 371 (c)(1),
(2), (4) Date: Feb. 21, 2014

(87) PCT Pub. No.: WO2013/027415
PCT Pub. Date: Feb. 28, 2013

(65) Prior Publication Data
US 2014/0193729 A1 Jul. 10, 2014

(30) Foreign Application Priority Data
Aug. 25, 2011 (JP) .................................. 2011-183750

(51) Int. Cl.
*H01M 8/04* (2006.01)
*H01M 8/06* (2006.01)

(52) U.S. Cl.
CPC ...... *H01M 8/04776* (2013.01); *H01M 8/04373* (2013.01); *H01M 8/04425* (2013.01); *H01M 8/04783* (2013.01); *H01M 8/0618* (2013.01); *H01M 8/0662* (2013.01); *Y02E 60/50* (2013.01)

(58) Field of Classification Search
CPC .......... H01M 8/04776; H01M 8/0618; H01M 8/04373; H01M 8/04425
See application file for complete search history.

(56) References Cited

U.S. PATENT DOCUMENTS

| | | |
|---|---|---|
| 2001/0014300 A1 | 8/2001 | Hashigaya et al. |
| 2004/0038095 A1 | 2/2004 | Kushibiki et al. |

(Continued)

FOREIGN PATENT DOCUMENTS

| | | |
|---|---|---|
| JP | 11-307110 A | 11/1999 |
| JP | 2003-146609 A | 5/2003 |

(Continued)

OTHER PUBLICATIONS

Japanese Office Action issued in Japanese Application No. 2013-529905 dated Apr. 30, 2014.

(Continued)

*Primary Examiner* — Stewart Fraser
(74) *Attorney, Agent, or Firm* — McDermott Will & Emery LLP

(57) ABSTRACT

A fuel cell system includes: a reformer configured to generate a hydrogen-containing gas through a reforming reaction by using a raw material and steam; a raw material supply device configured to supply the raw material to the reformer; a steam supply device configured to supply the steam to the reformer; a temperature detector configured to detect a temperature of the reformer; a fuel cell configured to generate electric power by using the hydrogen-containing gas; a combustor configured to combust the hydrogen-containing gas discharged from the fuel cell to heat the reformer; and a controller configured to, while controlling the raw material supply device such that the temperature detected by the temperature detector becomes a target temperature, control the steam supply device such that a change rate of a steam supply amount to the reformer becomes less than a change rate of a raw material supply amount to the reformer.

11 Claims, 11 Drawing Sheets

(56) References Cited

U.S. PATENT DOCUMENTS

| | | | | |
|---|---|---|---|---|
| 2008/0280171 A1* | 11/2008 | Maenishi | ............ | C01B 3/384 429/412 |
| 2009/0004516 A1 | 1/2009 | Bai et al. | | |
| 2009/0092883 A1* | 4/2009 | Ozeki | ............ | C01B 3/323 429/425 |
| 2009/0317671 A1* | 12/2009 | Ukai | ............ | B01J 8/0465 429/425 |
| 2010/0323257 A1* | 12/2010 | Fujihara | ............ | C01B 3/384 429/423 |
| 2011/0039172 A1* | 2/2011 | Kani | ............ | C01B 3/384 429/423 |
| 2011/0136025 A1* | 6/2011 | Tatsui | ............ | C01B 3/00 429/412 |
| 2011/0269038 A1* | 11/2011 | Yukimasa | ............ | C01B 3/384 429/423 |
| 2012/0270121 A1* | 10/2012 | Nakajima | ............ | C01B 3/384 429/413 |

FOREIGN PATENT DOCUMENTS

| | | |
|---|---|---|
| JP | 2003-183005 A | 7/2003 |
| JP | 2005-093126 A | 4/2005 |
| JP | 2005-200260 A | 7/2005 |
| JP | 2007-273281 A | 10/2007 |
| JP | 2007-323972 A | 12/2007 |
| JP | 2008-050254 A | 3/2008 |
| JP | 2008-251446 A | 10/2008 |
| JP | 2009-110951 A | 5/2009 |
| JP | 2010-225499 A | 10/2010 |

OTHER PUBLICATIONS

International Search Report issued in International Application No. PCT/JP2012/005320 with Date of mailing Nov. 27, 2012, with English Translation.

Extended European Search Report issued in European Application No. 12825207.9, dated Feb. 13, 2015.

\* cited by examiner

FUEL CELL SYSTEM AND METHOD OF OPERATING THE SAME

RELATED APPLICATIONS

This application is the U.S. National Phase under 35 U.S.C. §371 of International Application No. PCT/JP2012/005320, filed on Aug. 24, 2012, which in turn claims the benefit of Japanese Application No. 2011-183750, filed on Aug. 25, 2011, the disclosures of which applications are incorporated by reference herein.

TECHNICAL FIELD

The present invention relates to fuel cell systems and methods of operating the same.

BACKGROUND ART

Fuel cell systems are configured to: supply a hydrogen-containing gas and an oxygen-containing gas to a fuel cell stack (hereinafter, simply referred to as a "fuel cell") which is the main body of the system's power generating part; cause an electrochemical reaction between hydrogen and oxygen to progress; and extract chemical energy generated through the electrochemical reaction as electrical energy to generate electric power. Fuel cell systems are capable of generating electric power with high efficiency, and allowing thermal energy generated during a power generation operation to be readily utilized. Therefore, fuel cell systems are being developed as distributed power generation systems that make it possible to realize highly efficient energy utilization.

Generally speaking, it is often the case that an infrastructure serving as the source of supply of the hydrogen-containing gas is not developed. Therefore, conventional fuel cell systems are provided with a hydrogen generation apparatus. Such a hydrogen generation apparatus includes a reformer configured to generate a reformed gas (a hydrogen-containing gas) (see Patent Literature 1, for example). The hydrogen generation apparatus uses water and a raw material. The raw material is, for example, city gas which contains natural gas as a main component and which is supplied from an existing infrastructure, or LPG. The hydrogen generation apparatus causes a reforming reaction between the water and the raw material at temperatures of 600° C. to 700° C. by using a Ru catalyst or a Ni catalyst, thereby generating the reformed gas. Usually, the reformed gas obtained through the reforming reaction contains carbon monoxide, which is derived from the raw material. If the carbon monoxide concentration in the reformed gas is high, it causes degradation of the power generation performance of the fuel cell. Therefore, it is often the case that, in addition to the reformer, the hydrogen generation apparatus includes reactors, for example, a shift converter and selective removers such as a selective oxidizer and a methanation remover. The shift converter includes a Cu—Zn based catalyst, and causes a shift reaction between carbon monoxide and steam to progress at temperatures of 200° C. to 350° C., thereby reducing carbon monoxide. The selective oxidizer selectively causes a carbon monoxide oxidation reaction at temperatures of 100° C. to 200° C., thereby further reducing carbon monoxide. The methanation remover selectively causes carbon monoxide methanation, thereby reducing carbon monoxide.

In the hydrogen generation apparatus, there are cases where aging variation of a reforming water pump and a raw material flowmeter, which are included in the source of supply of the reforming water and the raw material, causes a temporal change in the ratio between the supplied raw material and the supplied water. In this case, a change in steam/carbon ratio occurs. If a significant abnormality occurs in the steam/carbon ratio, it becomes difficult to cause a proper reaction in the reformer. This may consequently cause, for example, problems as follows: the hydrogen-containing gas content in a fuel gas supplied to the fuel cell decreases, or the carbon monoxide gas content in the reformed gas after passing through the shift converter increases. Moreover, in some cases, the power generation voltage of the fuel cell drops, which may cause the fuel cell to stop. Therefore, there is proposed a method for determining an abnormality that the steam/carbon ratio is high (see Patent Literature 2, for example).

CITATION LIST

Patent Literature

PTL 1: Japanese Laid-Open Patent Application Publication No. 2003-183005

PTL 2: Japanese Laid-Open Patent Application Publication No. 2007-273281

SUMMARY OF INVENTION

Technical Problem

Conventional fuel cell systems have a problem in that their operation becomes unstable when the composition of the raw material has changed.

The present invention solves the problem. An object of the present invention is to provide a fuel cell system capable of suppressing operational destabilization compared to conventional art even when the composition of the raw material has changed.

Solution to Problem

The inventors of the present invention conducted diligent studies in order to realize operational stabilization of a fuel cell system. As a result of the studies, the inventors obtained the findings described below.

In a fuel cell system, the amount of hydrogen-containing gas generated by the hydrogen generation apparatus and a raw material supply amount to the hydrogen generation apparatus (the term "supply amount" herein refers to a volume supplied per unit time, i.e., a volumetric flow rate; the same applies hereinafter) are controlled in accordance with the amount of electric power generated by the fuel cell, such that the temperature of the reformer is kept constant. A water supply amount to the hydrogen generation apparatus is determined based on the raw material supply amount to the hydrogen generation apparatus and a target steam/carbon ratio. When the composition of the raw material changes, the amount of generated heat changes even if the raw material supply amount is the same. As a result, a thermal balance in the hydrogen generation apparatus changes, and the hydrogen-containing gas generation becomes unstable. For example, if a raw material that causes heat to be generated in a smaller amount per unit supply amount of the raw material and that has a smaller carbon number is supplied, then the raw material supply amount will become larger in order to obtain a necessary amount of hydrogen-containing gas. Since the water supply amount is in accordance with the raw material supply amount, the water supply amount also increases, which may cause insufficiency in steam generation performance. As a result, the operation of the hydrogen generation apparatus becomes unstable, and a necessary amount of hydrogen-containing gas for the fuel cell cannot be obtained. This results in a problem of unstable operation of the fuel cell system.

One example is given below, in which methane ($CH_4$) is used as the raw material. One mole of methane reacts with two moles of steam. As a result, four moles of hydrogen ($H_2$) are generated. In order for such a reforming reaction to progress smoothly, it is often the case that the amount of steam is made excessive. In the example described below, it is assumed that three moles of steam are supplied to one mole of methane, and the steam/carbon ratio is 3.

Here, assume that the composition of the raw material has changed from 100% methane into a mixed gas of 87% methane and 13% propane ($C_3H_8$). With one mole of the mixed gas, 4.78 moles of hydrogen are generated. Accordingly, if it is assumed that one mole of methane has been supplied to the hydrogen generation apparatus; four moles of hydrogen have been supplied to the fuel cell; there has been no change in the output from the fuel cell; and the temperature of the reformer has been kept constant, then the supply amount of the mixed gas will be 4/4.78=83.7%, i.e., 0.837 moles. That is, the raw material supply amount decreases from 1 mole to 0.837 moles, i.e., decreases by 16.3%. At the time, the number of moles of carbon atoms supplied per unit time changes from 1 mole to 1.05 moles. Thus, the change rate is merely 5%. That is, the change rate of the raw material supply amount is significantly different from the change rate of the number of moles of carbon atoms supplied per unit time.

Meanwhile, generally speaking, the supply amount of the steam is determined based on the raw material supply amount and the target steam/carbon ratio. Accordingly, unless a controller recognizes that the composition of the raw material has changed, the controller decreases the steam supply amount to 83.7% of previous 3 moles, that is, 2.51 moles.

In this state, if the steam/carbon ratio is calculated, the ratio is 2.51/1.05=2.39. Thus, the steam/carbon ratio significantly decreases from the previous ratio of 3. When the steam/carbon ratio decreases, a problem such as carbon deposition occurs, and thus the operation of the hydrogen generation apparatus may become unstable.

Conversely, assume that the composition of the raw material has changed from a mixed gas of 87% methane and 13% propane into 100% methane. With one mole of the mixed gas, 4.78 moles of hydrogen are generated. Accordingly, if it is assumed that 0.837 moles of the mixed gas have been supplied to the hydrogen generation apparatus; four moles of hydrogen have been supplied to the fuel cell; there has been no change in the output from the fuel cell; and the temperature of the reformer has been kept constant, then the supply amount of methane will be 1.19 moles. That is, the raw material supply amount increases from 0.837 moles to 1.19 moles, i.e., increases by 42.2%. At the time, the number of moles of carbon atoms supplied per unit time increases from 1.05 moles to 1.19 moles. Thus, the increase is merely 13%.

Unless the controller recognizes that the composition of the raw material has changed, the controller increases the steam supply amount by 42.2% from previous 3 moles to 4.27 moles.

In this state, if the steam/carbon ratio is calculated, the ratio is 4.27/1.19=3.58. Thus, the steam/carbon ratio significantly increases from the previous ratio of 3. When the steam/carbon ratio increases, the water supply amount becomes excessive, which causes, for example, decrease in the reformer temperature, and thus the operation of the hydrogen generation apparatus may become unstable.

The above-described problems occur since a steam supply amount necessary for generating a fixed amount of hydrogen varies in accordance with the composition of the raw material. To be more specific, in a case where the composition of the raw material has changed, the change rate of the necessary steam supply amount is less than the change rate of the raw material supply amount. Usually, a controller cannot recognize a change in the composition of the raw material. If a controller changes the steam supply amount in proportional to a change in the raw material supply amount, then it becomes difficult to maintain the steam/carbon ratio at a target value. As a result, the operation of the hydrogen generation apparatus tends to become unstable.

In view of the above, the inventors of the present invention have arrived at the following idea: by controlling a steam supply device such that the change rate of the steam supply amount to the reformer becomes less than the change rate of the raw material supply amount to the reformer, changes in the steam/carbon ratio can be suppressed, and thereby the operation of the hydrogen generation apparatus can be stabilized.

In order to solve the above-described problems, a fuel cell system according to the present invention includes: a reformer configured to generate a hydrogen-containing gas through a reforming reaction by using a raw material and steam; a raw material supply device configured to supply the raw material to the reformer; a steam supply device configured to supply the steam to the reformer; a temperature detector configured to detect a temperature of the reformer; a fuel cell configured to generate electric power by using the hydrogen-containing gas; a combustor configured to combust the hydrogen-containing gas discharged from the fuel cell to heat the reformer; and a controller configured to, while controlling the raw material supply device such that the temperature detected by the temperature detector becomes a target temperature, control the steam supply device such that a change rate of a steam supply amount to the reformer becomes less than a change rate of a raw material supply amount to the reformer.

Further, a method of operating a fuel cell system according to the present invention includes: generating, by a reformer, a hydrogen-containing gas by using a raw material and steam; generating, by a fuel cell, electric power by using the hydrogen-containing gas; heating the reformer by combusting the hydrogen-containing gas discharged from the fuel cell; detecting a temperature of the reformer; controlling a raw material supply amount to the reformer such that the detected temperature of the reformer becomes a target temperature; and while controlling the raw material supply amount to the reformer such that the detected temperature of the reformer becomes the target temperature, controlling a steam supply amount to the reformer such that a change rate of the steam supply amount to the reformer becomes less than a change rate of the raw material supply amount to the reformer.

Advantageous Effects of Invention

According to the fuel cell system and the method of operating the fuel cell system according to the present invention, operational destabilization due to changes in the composition of the raw material is suppressed compared to conventional art.

DESCRIPTION OF EMBODIMENTS

Embodiment 1

A fuel cell system according to Embodiment 1 includes: a reformer configured to generate a hydrogen-containing gas through a reforming reaction by using a raw material and steam; a raw material supply device configured to supply the raw material to the reformer; a steam supply device configured to supply the steam to the reformer; a temperature detector configured to detect a temperature of the reformer; a fuel cell configured to generate electric power by using the hydrogen-containing gas; a combustor configured to combust the hydrogen-containing gas discharged from the fuel cell to heat the reformer; and a controller configured to, while controlling the raw material supply device such that the temperature detected by the temperature detector becomes a target temperature, control the steam supply device such that a change rate of a steam supply amount to the reformer becomes less than a change rate of a raw material supply amount to the reformer.

A method of operating a fuel cell system according to Embodiment 1 includes: generating, by a reformer, a hydrogen-containing gas by using a raw material and steam; generating, by a fuel cell, electric power by using the hydrogen-containing gas; heating the reformer by combusting the hydrogen-containing gas discharged from the fuel cell; detecting a temperature of the reformer; controlling a raw material supply amount to the reformer such that the detected temperature of the reformer becomes a target temperature; and while controlling the raw material supply amount to the reformer such that the detected temperature of the reformer becomes the target temperature, controlling a steam supply amount to the reformer such that a change rate of the steam supply amount to the reformer becomes less than a change rate of the raw material supply amount to the reformer.

According to the above configuration, operational destabilization due to changes in the composition of the raw material is suppressed compared to conventional fuel cell systems.

[Apparatus Configuration]

Figure 1:
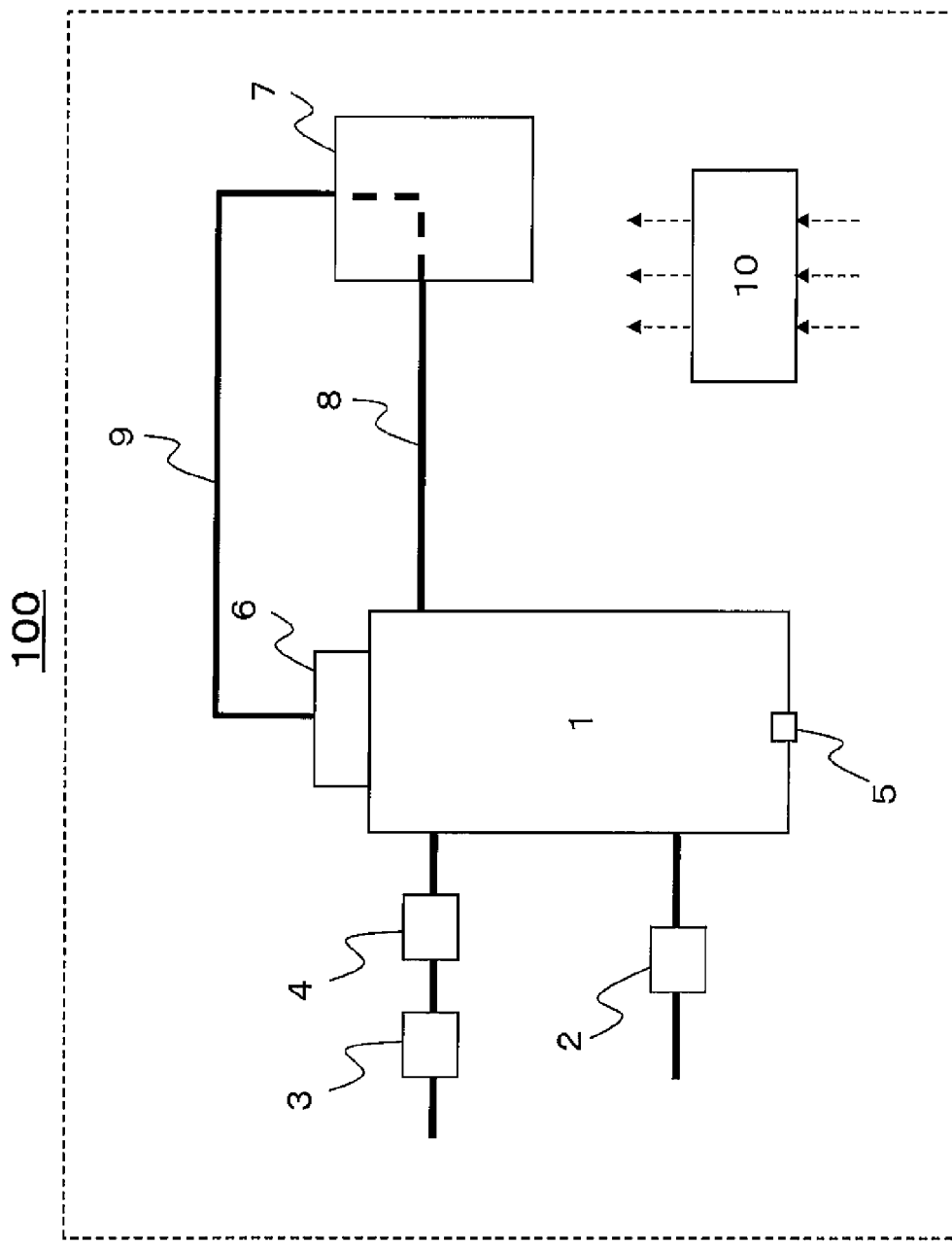
FIG. 1 is a block diagram showing an example of a schematic configuration of a fuel cell system according to Embodiment 1.

FIG. 1 is a block diagram showing an example of a schematic configuration of the fuel cell system according to Embodiment 1.

In the example of FIG. 1, a hydrogen generation apparatus 100 according to the present embodiment includes a reformer 1, a raw material supply device 2, a steam supply device including a water feeder 3 and an evaporator 4, a temperature detector 5, a combustor 6, a fuel cell 7, and a controller 10.

The reformer 1 causes a reforming reaction by using a raw material and steam, thereby generating a hydrogen-containing gas. The reforming reaction may be any type of reforming reaction. Specific examples of the reforming reaction include steam reforming reaction, autothermal reaction, and partial oxidation reaction. A reforming catalyst is disposed within the reformer 1. The reforming catalyst causes the reforming reaction to progress, and thereby the hydrogen-containing gas can be generated from the raw material and water. Heat required for the reforming reaction is supplied from the combustor 6. Generally speaking, at least one kind of catalyst selected from the group consisting of noble metal-based catalysts and Ni is suitably used as the reforming catalyst. Examples of the noble metal-based catalysts include Pt-based, Ru-based, and Rh-based catalysts. A reforming catalyst containing Ru is used in the hydrogen generation apparatus according to the present embodiment.

The raw material contains an organic compound whose constituent elements are at least carbon and hydrogen. Specific examples of the raw material include hydrocarbons such as natural gas, city gas, LPG, and LNG. The city gas refers to a gas that is supplied from a gas company to households and the like through piping. Examples of the source of the raw material include infrastructures supplying the aforementioned gases and gas canisters storing the aforementioned gases.

It should be noted that a CO reducer for reducing carbon monoxide in the hydrogen-containing gas generated by the reformer 1 may be provided downstream from the reformer 1. The CO reducer includes at least one of a shift converter and a CO remover. The shift converter includes a shift conversion catalyst and reduces carbon monoxide through a shift reaction. The CO remover includes a CO removing catalyst and reduces carbon monoxide through at least one of an oxidation reaction and a methanation reaction.

The raw material supply device 2 supplies the raw material to the reformer 1. The raw material supply device 2 serves to adjust the flow rate of the raw material supplied to the reformer 1. In the present embodiment, the raw material supply device 2 includes a booster and a flow rate adjusting valve. It should be noted that the configuration of the raw material supply device 2 is not limited to this example. The raw material supply device 2 may include either a booster or a flow rate adjusting valve.

The steam supply device supplies steam to the reformer 1. In the example of FIG. 1, the steam supply device includes the water feeder 3 and the evaporator 4. The water feeder 3 is a pump, for example. The evaporator 4 evaporates water fed from the water feeder 3, and supplies the evaporated water to the reformer 1. Heat for heating the evaporator 4 may be supplied by an electric heater, or may be supplied by the combustor 6. It should be noted that, preferably, the steam supply device is configured to be heated by the combustor 6.

The temperature detector 5 detects the temperature of the reformer 1. The temperature detector 5 may be configured in any form, so long as the temperature detector 5 is configured to detect the temperature of the reformer 1. For example, the temperature detector 5 may be directly attached to the reformer 1. Alternatively, the temperature detector 5 may be attached to a passage downstream from the reformer 1. That is, the temperature detector 5 may detect the temperature of the reformer 1 either directly or indirectly.

The combustor 6 combusts the hydrogen-containing gas that is discharged from the fuel cell 7, thereby heating the reformer 1. In addition to the hydrogen-containing gas, other gases may be supplied to the combustor 6 as a fuel.

The fuel cell 7 causes the hydrogen-containing gas and an oxidizing gas to react with each other, thereby generating electric power. The fuel cell 7 may be any type of fuel cell. For example, a polymer electrolyte fuel cell (PEFC), a solid oxide fuel cell (SOFC), or a phosphoric acid fuel cell may be used as the fuel cell 7. If the fuel cell 7 is a polymer electrolyte fuel cell, then the reformer 1 and the fuel cell 7 are configured as separate components in the fuel cell system 100. If the fuel cell 7 is a solid oxide fuel cell, the fuel cell may be of either an indirect internal reforming type or a direct internal reforming type. The indirect internal reforming type fuel cell separately includes an individual reformer unit configured to perform a reforming reaction and an individual fuel cell unit. The direct internal reforming type fuel cell performs a reforming reaction inside the fuel cell body. That is, there is a case where the reformer 1 is configured to be incorporated in the fuel cell 7. The fuel cell system according to the present invention may be configured in such a manner.

The controller 10, while controlling the raw material supply device 2 such that the temperature detected by the temperature detector 5 becomes a target temperature, controls the steam supply device such that the change rate of a steam supply amount to the reformer 1 becomes less than the change rate of a raw material supply amount to the reformer 1.

The controller 10 may be configured as any device, so long as the controller 10 has control functions. The controller 10 includes an arithmetic processing unit and a storage unit storing control programs. For example, the controller 10 may be configured as a microcontroller, PLC (Programmable Logic Controller), or the like. Examples of the arithmetic processing unit include an MPU and a CPU. The storage unit is a memory, for example. The controller 10 may be configured as a single controller performing centralized control, or may be configured as a group of multiple controllers performing distributed control in cooperation with each other.

A hydrogen-containing gas supply passage 8 is a passage, through which the hydrogen-containing gas discharged from the reformer 1 is supplied to the anode of the fuel cell 7. The gas discharged from the anode of the fuel cell 7 contains unreacted hydrogen. A hydrogen-containing gas discharge passage 9 is a passage, through which the hydrogen-containing gas discharged from the anode of the fuel cell 7 is supplied to the combustor 6.

[Operation Method]

Figure 2:
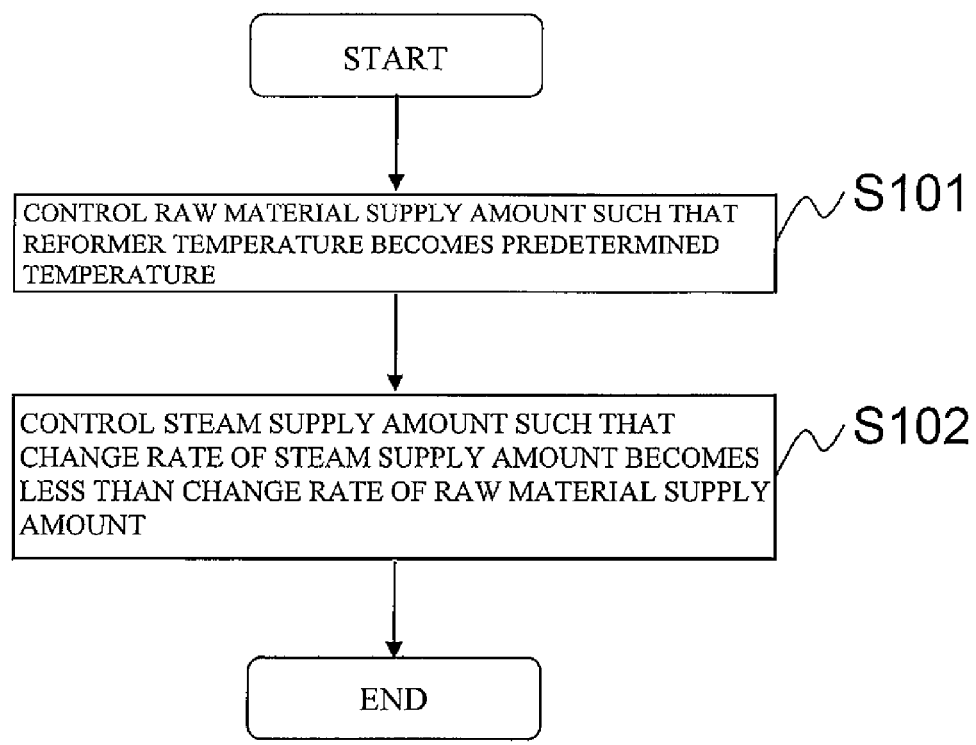
FIG. 2 is a flowchart showing an example of a method of operating the fuel cell system according to Embodiment 1.

FIG. 2 is a flowchart showing an example of a method of operating the fuel cell system according to Embodiment 1. Hereinafter, the method of operating the fuel cell system according to Embodiment 1 is described with reference to FIG. 2.

After the fuel cell system 100 has started a power generation operation (START), if the composition of the raw material has changed and the temperature detected by the temperature detector 5, i.e., the temperature of the reformer 1, has deviated from a target temperature, the controller 10 controls the raw material supply amount via the raw material supply device 2 such that the temperature detected by the temperature detector 5 becomes the target temperature (step S101). At the time, the controller 10 controls the steam supply device such that the change rate of the steam supply amount to the reformer 1 becomes less than the change rate of the raw material supply amount to the reformer 1 (step S102). Thereafter, the operation of the fuel cell system 100 is ended (END).

It should be noted that, in the above description, control to be performed while the fuel cell system is performing power generation is described. However, even before the fuel cell system performs the power generation, the above-described control may be performed if the composition of the raw material has changed while the hydrogen-containing gas discharged from the fuel cell 7 is being combusted by the combustor 6 and thereby the reformer 1 is being heated. That is, the above-described control may be performed at any timing, so long as the control is performed while the hydrogen-containing gas discharged from the fuel cell 7 is being combusted by the combustor 6 and thereby the reformer 1 is being heated.

[Variation 1]

In a fuel cell system according to Variation 1 of Embodiment 1, the controller, when increasing the raw material supply amount to the reformer while controlling the raw material supply device such that the temperature detected by the temperature detector becomes the target temperature, controls the steam supply device such that an increasing rate of the steam supply amount to the reformer becomes less than an increasing rate of the raw material supply amount to the reformer.

Other than the above-described configuration, the fuel cell system according to Variation 1 of Embodiment 1 may be configured in the same manner as the fuel cell system according to Embodiment 1. Since the apparatus configuration of the fuel cell system according to Variation 1 of Embodiment 1 may be the same as that of the fuel cell system 100 shown in FIG. 1, the components of the fuel cell system according to Variation 1 of Embodiment 1 are denoted by the same reference signs and names as those used in FIG. 1, and a description of such common components is omitted.

Figure 3:
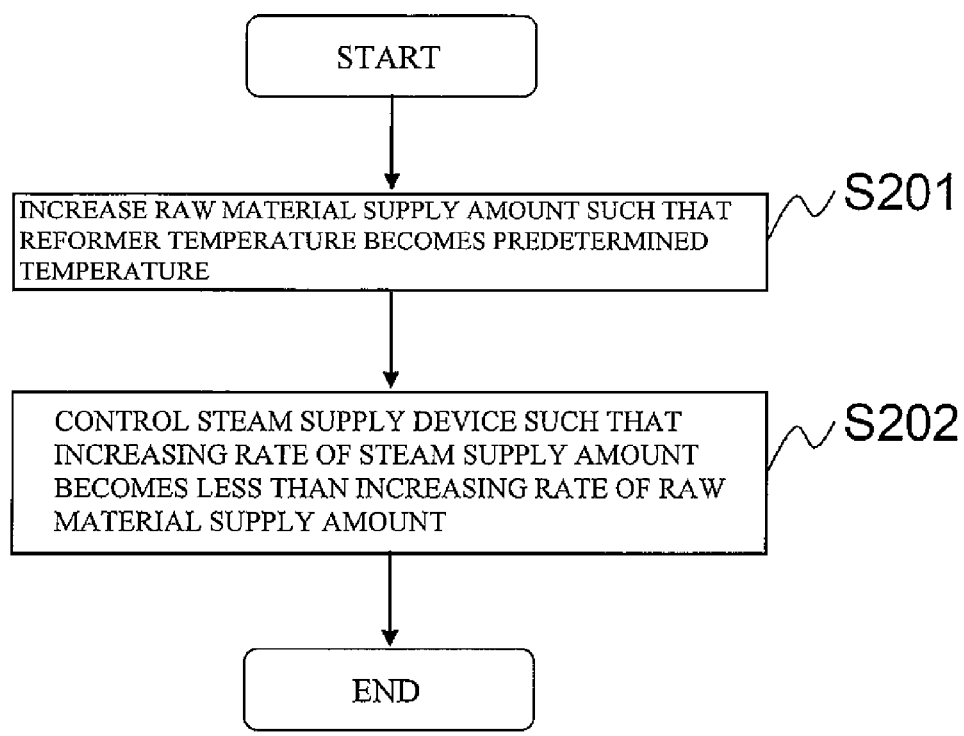
FIG. 3 is a flowchart showing an example of a method of operating a fuel cell system according to Variation 1 of Embodiment 1.

FIG. 3 is a flowchart showing an example of a method of operating the fuel cell system according to Variation 1 of Embodiment 1. Hereinafter, the method of operating the fuel cell system according to Variation 1 of Embodiment 1 is described with reference to FIG. 3.

After the fuel cell system has started a power generation operation (START), if the composition of the raw material has changed and the temperature detected by the temperature detector 5, i.e., the temperature of the reformer 1, has deviated from a target temperature, the controller 10 increases the raw material supply amount via the raw material supply device 2 such that the temperature detected by the temperature detector 5 becomes the target temperature (step S201). At the time, the controller 10 controls the steam supply device such that the increasing rate of the steam supply amount to the reformer 1 becomes less than the increasing rate of the raw material supply amount to the reformer 1 (step S202). Thereafter, the operation of the fuel cell system is ended (END).

It should be noted that the increasing rate herein may be defined as follows: {(supply amount after increasing)−(supply amount before increasing)}/(supply amount before increasing).

It should be noted that, in the above description, control to be performed while the fuel cell system is performing power generation is described. However, even before the fuel cell system performs the power generation, the above-described control may be performed if the composition of the raw material has changed while the hydrogen-containing gas discharged from the fuel cell 7 is being combusted by the combustor 6 and thereby the reformer 1 is being heated. That is, the above-described control may be performed at any timing, so long as the control is performed while the hydrogen-containing gas discharged from the fuel cell 7 is being combusted by the combustor 6 and thereby the reformer 1 is being heated.

[Variation 2]

In a fuel cell system according to Variation 2 of Embodiment 1, the controller, when increasing the raw material supply amount to the reformer while controlling the raw material supply device such that the temperature detected by the temperature detector becomes the target temperature, controls the steam supply device such that a decreasing rate of the steam supply amount to the reformer becomes less than an increasing rate of the raw material supply amount to the reformer.

Other than the above-described configuration, the fuel cell system according to Variation 2 of Embodiment 1 may be configured in the same manner as the fuel cell system according to Embodiment 1. Since the apparatus configuration of the fuel cell system according to Variation 2 of Embodiment 1 may be the same as that of the fuel cell system 100 shown in FIG. 1, the components of the fuel cell system according to Variation 2 of Embodiment 1 are denoted by the same reference signs and names as those used in FIG. 1, and a description of such common components is omitted.

Figure 4:
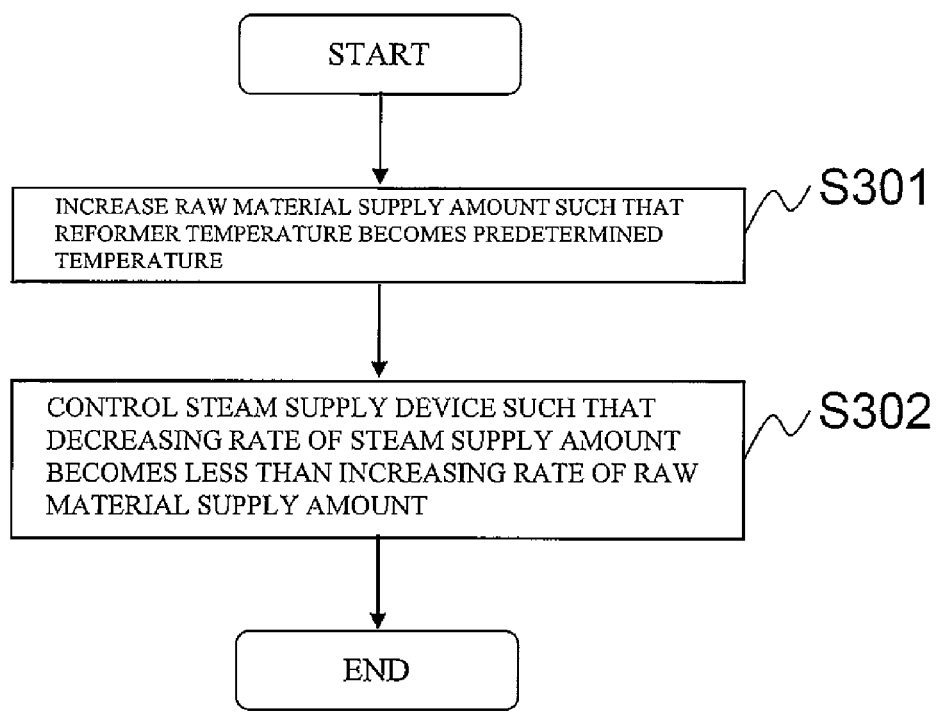
FIG. 4 is a flowchart showing an example of a method of operating a fuel cell system according to Variation 2 of Embodiment 1.

FIG. 4 is a flowchart showing an example of a method of operating the fuel cell system according to Variation 2 of Embodiment 1. Hereinafter, the method of operating the fuel cell system according to Variation 2 of Embodiment 1 is described with reference to FIG. 4.

After the fuel cell system has started a power generation operation (START), if the composition of the raw material has changed and the temperature detected by the temperature detector 5, i.e., the temperature of the reformer 1, has deviated from a target temperature, the controller 10 increases the raw material supply amount via the raw material supply device 2 such that the temperature detected by the temperature detector 5 becomes the target temperature (step S301). At the time, the controller 10 controls the steam supply device such that the decreasing rate of the steam supply amount to the reformer 1 becomes less than the increasing rate of the raw material supply amount to the reformer 1 (step S302). Thereafter, the operation of the fuel cell system is ended (END).

It should be noted that the decreasing rate herein may be defined as follows: {(supply amount before decreasing)–(supply amount after decreasing)}/(supply amount before decreasing).

It should be noted that, in the above description, control to be performed while the fuel cell system is performing power generation is described. However, even before the fuel cell system performs the power generation, the above-described control may be performed if the composition of the raw material has changed while the hydrogen-containing gas discharged from the fuel cell 7 is being combusted by the combustor 6 and thereby the reformer 1 is being heated. That is, the above-described control may be performed at any timing, so long as the control is performed while the hydrogen-containing gas discharged from the fuel cell 7 is being combusted by the combustor 6 and thereby the reformer 1 is being heated.

[Variation 3]

In a fuel cell system according to Variation 3 of Embodiment 1, the controller, when decreasing the raw material supply amount to the reformer while controlling the raw material supply device such that the temperature detected by the temperature detector becomes the target temperature, controls the steam supply device such that a decreasing rate of the steam supply amount to the reformer becomes less than a decreasing rate of the raw material supply amount to the reformer.

Other than the above-described configuration, the fuel cell system according to Variation 3 of Embodiment 1 may be configured in the same manner as the fuel cell system according to Embodiment 1. Since the apparatus configuration of the fuel cell system according to Variation 3 of Embodiment 1 may be the same as that of the fuel cell system 100 shown in FIG. 1, the components of the fuel cell system according to Variation 3 of Embodiment 1 are denoted by the same reference signs and names as those used in FIG. 1, and a description of such common components is omitted.

Figure 5:
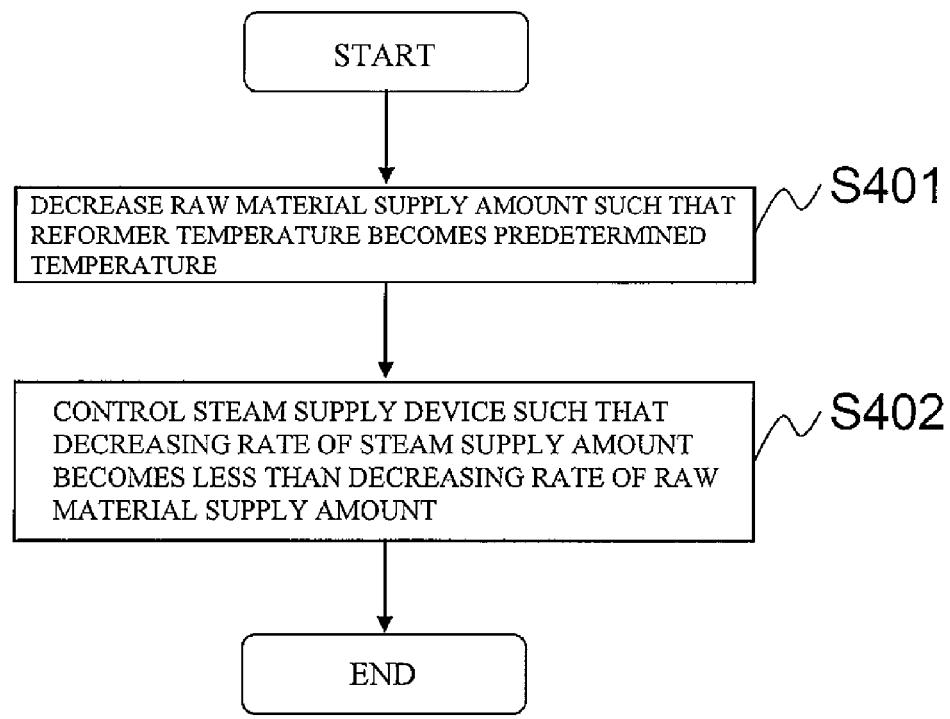
FIG. 5 is a flowchart showing an example of a method of operating a fuel cell system according to Variation 3 of Embodiment 1.

FIG. 5 is a flowchart showing an example of a method of operating the fuel cell system according to Variation 3 of Embodiment 1. Hereinafter, the method of operating the fuel cell system according to Variation 3 of Embodiment 1 is described with reference to FIG. 5.

After the fuel cell system has started a power generation operation (START), if the composition of the raw material has changed and the temperature detected by the temperature detector 5, i.e., the temperature of the reformer 1, has deviated from a target temperature, the controller 10 decreases the raw material supply amount via the raw material supply device 2 such that the temperature detected by the temperature detector 5 becomes the target temperature (step S401). At the time, the controller 10 controls the steam supply device such that the decreasing rate of the steam supply amount to the reformer 1 becomes less than the decreasing rate of the raw material supply amount to the reformer 1 (step S402). Thereafter, the operation of the fuel cell system is ended (END).

It should be noted that, in the above description, control to be performed while the fuel cell system is performing power generation is described. However, even before the fuel cell system performs the power generation, the above-described control may be performed if the composition of the raw material has changed while the hydrogen-containing gas discharged from the fuel cell 7 is being combusted by the combustor 6 and thereby the reformer 1 is being heated. That is, the above-described control may be performed at any timing, so long as the control is performed while the hydrogen-containing gas discharged from the fuel cell 7 is being combusted by the combustor 6 and thereby the reformer 1 is being heated.

[Variation 4]

In a fuel cell system according to Variation 4 of Embodiment 1, the controller, when decreasing the raw material supply amount to the reformer while controlling the raw material supply device such that the temperature detected by the temperature detector becomes the target temperature, controls the steam supply device such that an increasing rate of the steam supply amount to the reformer becomes less than a decreasing rate of the raw material supply amount to the reformer.

Other than the above-described configuration, the fuel cell system according to Variation 4 of Embodiment 1 may be configured in the same manner as the fuel cell system according to Embodiment 1. Since the apparatus configuration of the fuel cell system according to Variation 4 of Embodiment 1 may be the same as that of the fuel cell system 100 shown in FIG. 1, the components of the fuel cell system according to Variation 4 of Embodiment 1 are denoted by the same reference signs and names as those used in FIG. 1, and a description of such common components is omitted.

Figure 6:
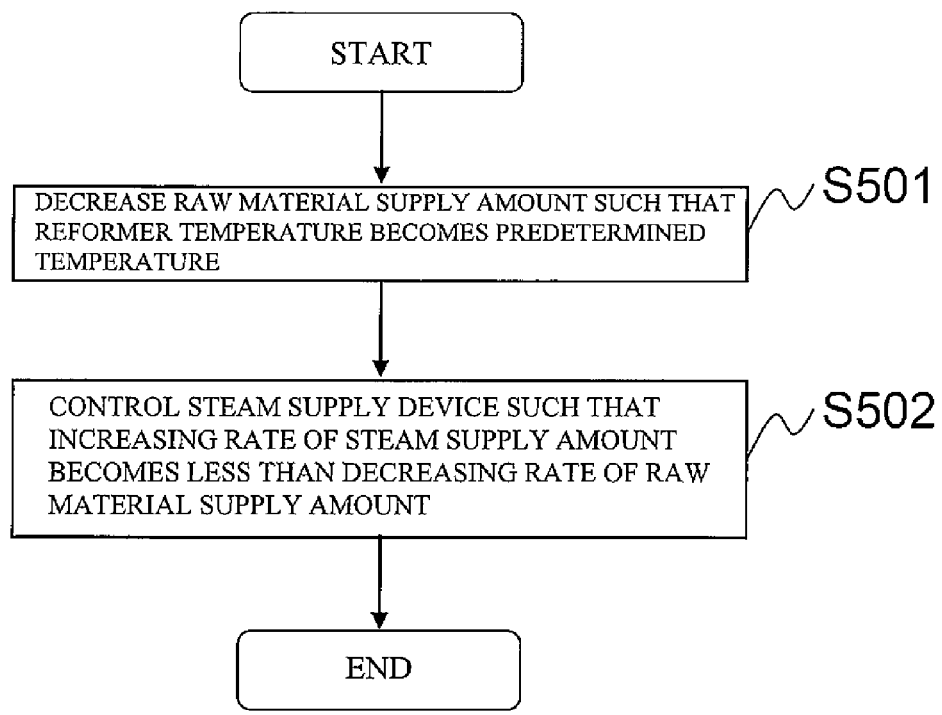
FIG. 6 is a flowchart showing an example of a method of operating a fuel cell system according to Variation 4 of Embodiment 1.

FIG. 6 is a flowchart showing an example of a method of operating the fuel cell system according to Variation 4 of Embodiment 1. Hereinafter, the method of operating the fuel cell system according to Variation 4 of Embodiment 1 is described with reference to FIG. 6.

After the fuel cell system has started a power generation operation (START), if the composition of the raw material has changed and the temperature detected by the temperature detector 5, i.e., the temperature of the reformer 1, has deviated from a target temperature, the controller 10 decreases the raw material supply amount via the raw material supply device 2 such that the temperature detected by the temperature detector 5 becomes the target temperature (step S501). At the time, the controller 10 controls the steam supply device such that the increasing rate of the steam supply amount to the reformer 1 becomes less than the decreasing rate of the raw material supply amount to the reformer 1 (step S502). Thereafter, the operation of the fuel cell system is ended (END).

It should be noted that, in the above description, control to be performed while the fuel cell system is performing power generation is described. However, even before the fuel cell system performs the power generation, the above-described control may be performed if the composition of the raw material has changed while the hydrogen-containing gas discharged from the fuel cell 7 is being combusted by the combustor 6 and thereby the reformer 1 is being heated. That is, the above-described control may be performed at any timing, so long as the control is performed while the hydrogen-containing gas discharged from the fuel cell 7 is being combusted by the combustor 6 and thereby the reformer 1 is being heated.

Embodiment 2

In a fuel cell system according to Embodiment 2, the controller, while controlling the raw material supply device such that the temperature detected by the temperature detector becomes the target temperature, controls the steam supply device such that the steam supply amount to the reformer becomes a value that is set in accordance with an amount of electric power generated by the fuel cell.

According to this configuration, changes in steam/carbon ratio due to changes in the composition of the raw material are suppressed compared to conventional fuel cell systems.

As one example, a description is given of a case where conditions that the raw material is 100% methane and three moles of steam are supplied per mole of the raw material have been changed such that the composition of the raw material is 87% methane and 13% propane (the average composition of the raw material is $C_{1.26}H_{4.56}$). In the case where the composition of the raw material is 87% methane and 13% propane, if a constant amount of hydrogen that is necessary for obtaining the same power generation amount as that in the case where the raw material is 100% methane is supplied, then it is necessary to supply 0.837 moles of the raw material. Here, since three moles of steam are supplied per mole of the raw material, the steam supply amount is 2.51 moles, and a steam/carbon ratio calculated from the average composition of the raw material is approximately 2.38. Meanwhile, in a case where the steam supply amount is set in accordance with the power generation amount as in the present embodiment, if, for example, it is set that three moles of steam are supplied regardless of changes in the raw material since the amount of electric power generated by the fuel cell is constant, then the steam/carbon ratio is approximately 2.84 even when the raw material whose composition is 87% methane and 13% propane is supplied. That is, the steam/carbon ratio can be stabilized even if the composition of the raw material has changed.

Other than the above-described configuration, the hydrogen generation apparatus according to Embodiment 2 may be configured in the same manner as the fuel cell system according to any one of Embodiment 1 and the variations thereof. Since the apparatus configuration of the fuel cell system according to Embodiment 2 may be the same as that of the fuel cell system 100 shown in FIG. 1, the components of the fuel cell system according to Embodiment 2 are denoted by the same reference signs and names as those used in FIG. 1, and a description of such common components is omitted.

Figure 7:
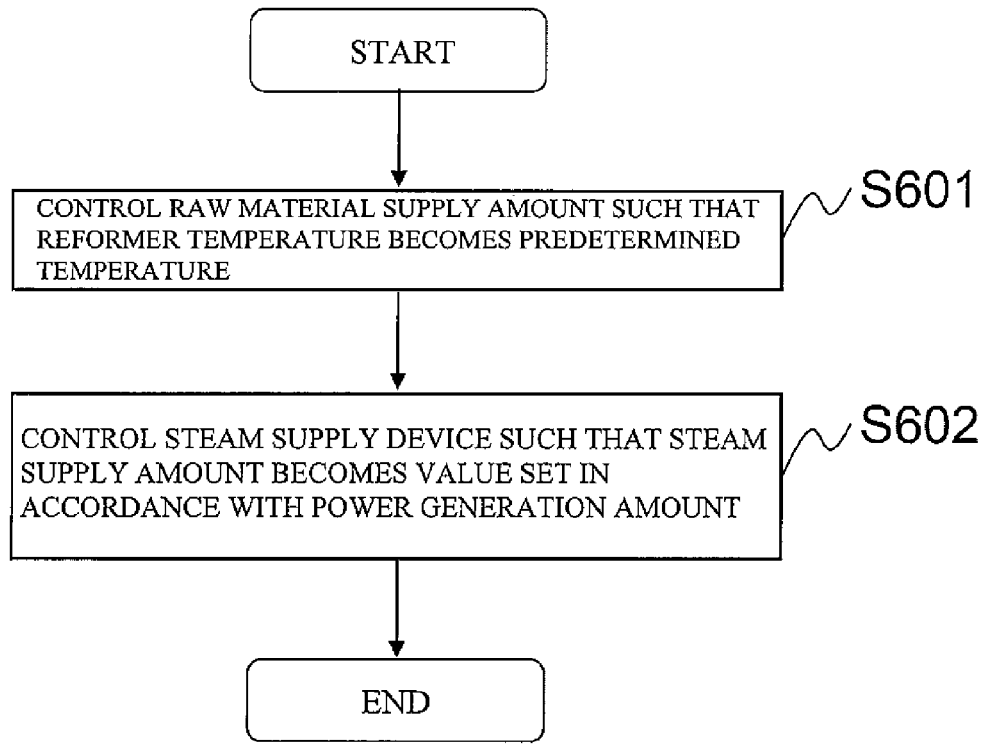
FIG. 7 is a flowchart showing an example of a method of operating a fuel cell system according to Embodiment 2.

FIG. 7 is a flowchart showing an example of a method of operating the fuel cell system according to Embodiment 2. Hereinafter, the method of operating the fuel cell system according to Embodiment 2 is described with reference to FIG. 7.

After the fuel cell system has started a power generation operation (START), if the composition of the raw material has changed and the temperature detected by the temperature detector 5, i.e., the temperature of the reformer 1, has deviated from a target temperature, the controller 10 controls the raw material supply amount via the raw material supply device 2 such that the temperature detected by the temperature detector 5 becomes the target temperature (step S601). At the time, the controller 10 controls the steam supply device such that the steam supply amount to the reformer 1 becomes a value that is set in accordance with the amount of electric power generated by the fuel cell 7 (step S602). Thereafter, the operation of the fuel cell system is ended (END).

It should be noted that, in the above description, control to be performed while the fuel cell system is performing power generation is described. However, even before the fuel cell system performs the power generation, the above-described control may be performed if the composition of the raw material has changed while the hydrogen-containing gas discharged from the fuel cell 7 is being combusted by the combustor 6 and thereby the reformer 1 is being heated. That is, the above-described control may be performed at any timing, so long as the control is performed while the hydrogen-containing gas discharged from the fuel cell 7 is being combusted by the combustor 6 and thereby the reformer 1 is being heated.

[Variation 1]

In a fuel cell system according to Variation 1 of Embodiment 2, the controller, when increasing the raw material supply amount to the reformer while controlling the raw material supply device such that the temperature detected by the temperature detector becomes the target temperature, controls the steam supply device such that the steam supply amount to the reformer becomes a value that is set in accordance with an amount of electric power generated by the fuel cell.

Other than the above-described configuration, the fuel cell system according to Variation 1 of Embodiment 2 may be configured in the same manner as the fuel cell system according to any one of Embodiment 1 and the variations thereof. Since the apparatus configuration of the fuel cell system according to Variation 1 of Embodiment 2 may be the same as that of the fuel cell system 100 shown in FIG. 1, the components of the fuel cell system according to Variation 1 of Embodiment 2 are denoted by the same reference signs and names as those used in FIG. 1, and a description of such common components is omitted.

Figure 8:
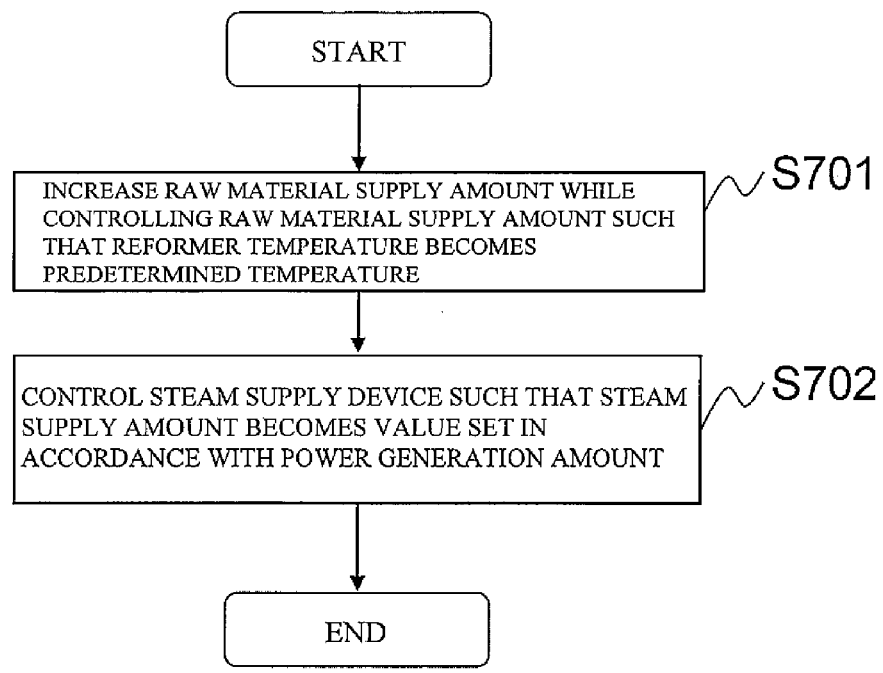
FIG. 8 is a flowchart showing an example of a method of operating a fuel cell system according to Variation 1 of Embodiment 2.

FIG. 8 is a flowchart showing an example of a method of operating the fuel cell system according to Variation 1 of Embodiment 2. Hereinafter, the method of operating the fuel cell system according to Variation 1 of Embodiment 2 is described with reference to FIG. 8.

After the fuel cell system has started a power generation operation (START), if the composition of the raw material has changed and the temperature detected by the temperature detector 5, i.e., the temperature of the reformer 1, has deviated from a target temperature, the controller 10 increases the raw material supply amount while controlling the raw material supply amount via the raw material supply device 2 such that the temperature detected by the temperature detector 5 becomes the target temperature (step S701). At the time, the controller 10 controls the steam supply device such that the steam supply amount to the reformer 1 becomes a value that is set in accordance with the amount of electric power generated by the fuel cell 7 (step S702). Thereafter, the operation of the fuel cell system is ended (END).

It should be noted that, in the above description, control to be performed while the fuel cell system is performing power generation is described. However, even before the fuel cell system performs the power generation, the above-described control may be performed if the composition of the raw material has changed while the hydrogen-containing gas discharged from the fuel cell 7 is being combusted by the combustor 6 and thereby the reformer 1 is being heated. That is, the above-described control may be performed at any timing, so long as the control is performed while the hydrogen-containing gas discharged from the fuel cell 7 is being combusted by the combustor 6 and thereby the reformer 1 is being heated.

[Variation 2]

In a fuel cell system according to Variation 2 of Embodiment 2, the controller, when decreasing the raw material supply amount to the reformer while controlling the raw material supply device such that the temperature detected by the temperature detector becomes the target temperature, controls the steam supply device such that the steam supply amount to the reformer becomes a value that is set in accordance with an amount of electric power generated by the fuel cell.

Other than the above-described configuration, the fuel cell system according to Variation 2 of Embodiment 2 may be configured in the same manner as the fuel cell system according to any one of Embodiment 1 and the variations thereof. Since the apparatus configuration of the fuel cell system according to Variation 2 of Embodiment 2 may be the same as that of the fuel cell system 100 shown in FIG. 1, the components of the fuel cell system according to Variation 2 of Embodiment 2 are denoted by the same reference signs and names as those used in FIG. 1, and a description of such common components is omitted.

Figure 9:
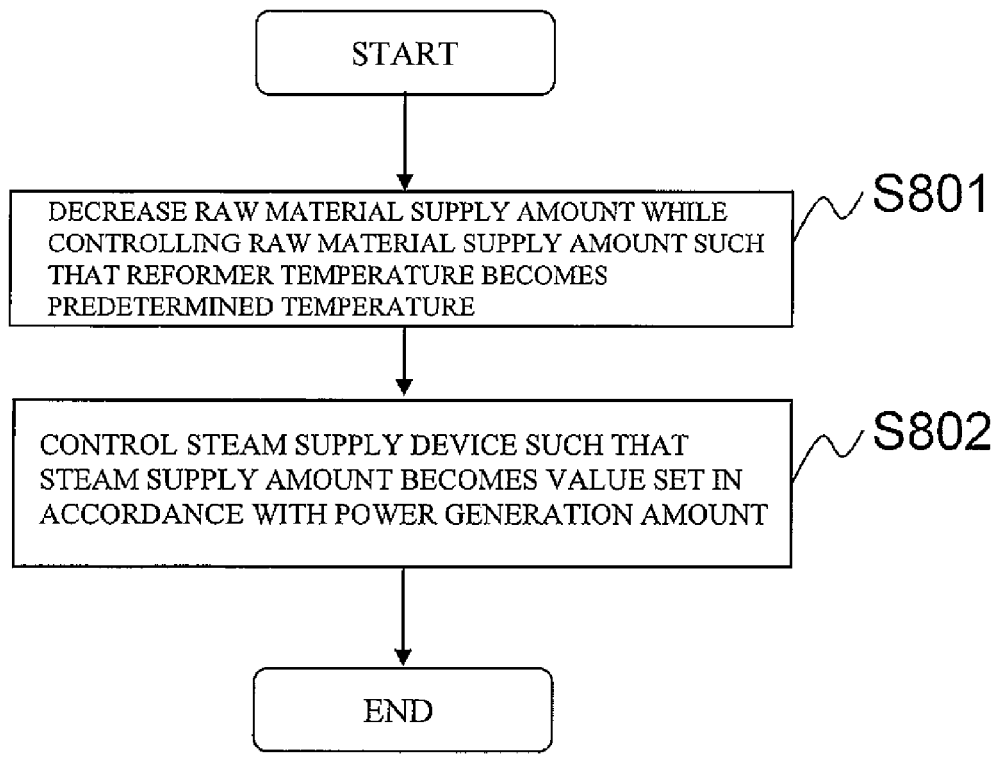
FIG. 9 is a flowchart showing an example of a method of operating a fuel cell system according to Variation 2 of Embodiment 2.

FIG. 9 is a flowchart showing an example of a method of operating the fuel cell system according to Variation 2 of Embodiment 2. Hereinafter, the method of operating the fuel cell system according to Variation 2 of Embodiment 2 is described with reference to FIG. 9.

After the fuel cell system has started a power generation operation (START), if the composition of the raw material has changed and the temperature detected by the temperature detector 5, i.e., the temperature of the reformer 1, has deviated from a target temperature, the controller 10 decreases the raw material supply amount while controlling the raw material supply amount via the raw material supply device 2 such that the temperature detected by the temperature detector 5 becomes the target temperature (step S801). At the time, the controller 10 controls the steam supply device such that the steam supply amount to the reformer 1 becomes a value that is set in accordance with the amount of electric power generated by the fuel cell 7 (step S802). Thereafter, the operation of the fuel cell system is ended (END).

It should be noted that, in the above description, control to be performed while the fuel cell system is performing power generation is described. However, even before the fuel cell system performs the power generation, the above-described control may be performed if the composition of the raw material has changed while the hydrogen-containing gas discharged from the fuel cell 7 is being combusted by the combustor 6 and thereby the reformer 1 is being heated. That is, the above-described control may be performed at any timing, so long as the control is performed while the hydrogen-containing gas discharged from the fuel cell 7 is being combusted by the combustor 6 and thereby the reformer 1 is being heated.

Embodiment 3

In a fuel cell system according to Embodiment 3, the controller: controls the raw material supply device such that the temperature detected by the temperature detector becomes the target temperature; and based on such a raw material supply amount to the reformer as to cause the temperature detected by the temperature detector to become the target temperature, updates the raw material supply amount to the reformer, the raw material supply amount being set in advance in relation to an amount of electric power generated by the fuel cell.

According to this configuration, changes in steam/carbon ratio due to changes in the composition of the raw material are suppressed compared to conventional fuel cell systems.

For example, in a case where the amount of electric power generated by the fuel cell is kept constant, if a raw material with a small combustion amount per unit volume (e.g., per mole) is used, then a necessary amount of raw material becomes relatively large. In contrast, if a raw material with a large combustion amount per unit volume is used, then a necessary amount of raw material becomes relatively small. Meanwhile, the number of carbon atoms in per unit volume of raw material is small in the case of a raw material with a small combustion amount per unit volume, and is large in the case of a raw material with a large combustion amount per unit volume (e.g., comparison between a raw material of methane 100% and a raw material of propane 100%). Based on the above, in a case where the amount of electric power generated by the fuel cell is kept constant and the raw material is supplied such that the temperature detected by the temperature detector becomes a target temperature, it is often the case that the carbon number in the raw material is small if the raw material supply amount is large, and the carbon number in the raw material is small if the raw material supply amount is small. Accordingly, even if the composition of the raw material has changed, the steam/carbon ratio can be stabilized by updating the raw material supply amount to the reformer based on such a raw material supply amount to the reformer as to cause the temperature detected by the temperature detector to become a target temperature. The raw material supply amount to be updated is set in advance in relation to the amount of electric power generated by the fuel cell.

Other than the above-described configuration, the fuel cell system according to Embodiment 3 may be configured in the same manner as the fuel cell system according to any one of Embodiment 1, Embodiment 2, and the variations thereof. Since the apparatus configuration of the fuel cell system according to Embodiment 3 may be the same as that of the fuel cell system 100 shown in FIG. 1, the components of the fuel cell system according to Embodiment 3 are denoted by the same reference signs and names as those used in FIG. 1, and a description of such common components is omitted.

Figure 10:
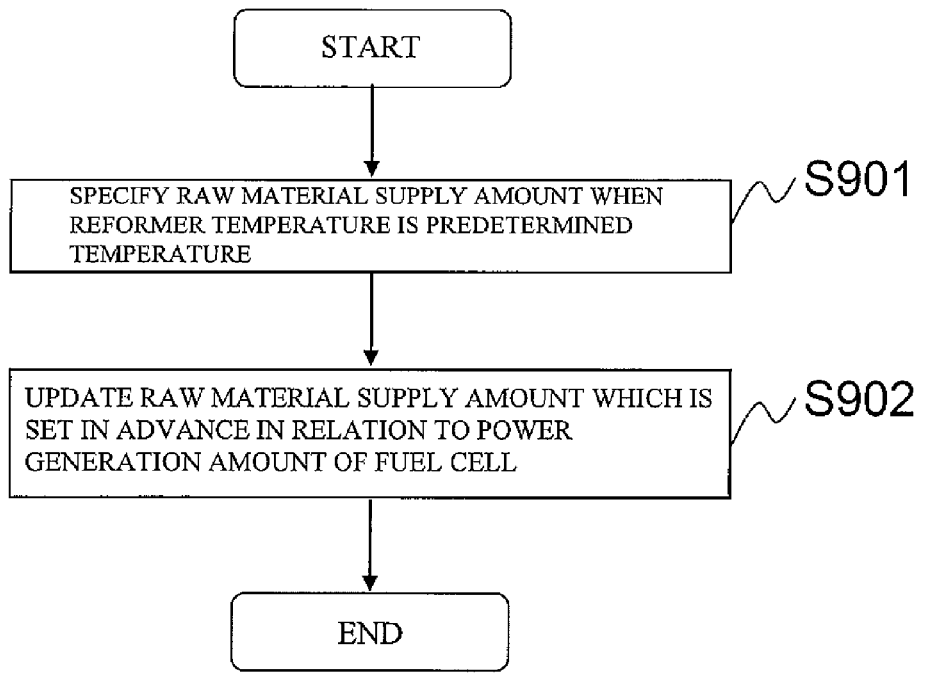
FIG. 10 is a flowchart showing an example of a method of operating a fuel cell system according to Embodiment 3.

FIG. 10 is a flowchart showing an example of a method of operating the fuel cell system according to Embodiment 3. Hereinafter, the method of operating the fuel cell system according to Embodiment 3 is described with reference to FIG. 10.

After the fuel cell system has started a power generation operation (START), if the composition of the raw material has changed and the temperature detected by the temperature detector 5, i.e., the temperature of the reformer 1, has deviated from a target temperature, the controller 10 controls the raw material supply amount via the raw material supply device 2 such that the temperature detected by the temperature detector 5 becomes the target temperature, and specifies the raw material supply amount when the temperature detected by the temperature detector 5 is the target temperature (step S901). The controller 10 updates the raw material supply amount to the reformer 1, which is set in advance in relation to the amount of electric power generated by the fuel cell 7 (step S902). Thereafter, the operation of the fuel cell system is ended (END).

It should be noted that, in the above description, control to be performed while the fuel cell system is performing power generation is described. However, even before the fuel cell system performs the power generation, the above-described control may be performed if the composition of the raw material has changed while the hydrogen-containing gas discharged from the fuel cell 7 is being combusted by the combustor 6 and thereby the reformer 1 is being heated. That is, the above-described control may be performed at any timing, so long as the control is performed while the hydrogen-containing gas discharged from the fuel cell 7 is being combusted by the combustor 6 and thereby the reformer 1 is being heated.

Embodiment 4

In a fuel cell system according to Embodiment 4, the controller controls the steam supply device, such that the steam supply amount to the reformer, the steam supply amount being set in relation to an amount of electric power generated by the fuel cell, increases in accordance with degradation of the fuel cell system.

According to this configuration, decrease in steam/carbon ratio due to degradation of the fuel cell system can be suppressed compared to conventional fuel cell systems.

If degradation has occurred in the fuel cell system, then a necessary amount of raw material for maintaining the same amount of electric power generated by the fuel cell system needs to be increased compared to the initial period of the operation. For example, if degradation of the fuel cell has occurred, it is necessary to increase the amount of current, and it is necessary to increase the raw material supply amount to the reformer in order to increase the amount of hydrogen supplied to the fuel cell. Moreover, in order to suppress decrease in hydrogen generation amount, the decrease being caused due to degradation of the reformer, the controlled temperature of the reformer needs to be increased. Therefore, it is necessary to increase the amount of heat of the gas flowing into the combustor through the fuel cell, by increasing the raw material supply amount to the reformer.

Based on the above, in a case where the steam supply amount in relation to the power generation amount is kept constant from the initial conditions of the operation, the steam/carbon ratio decreases if degradation of the fuel cell system progresses. Therefore, in the present embodiment, the steam supply device is controlled such that the steam supply amount to the reformer, which is set in relation to the amount of electric power generated by the fuel cell, increases in accordance with degradation of the fuel cell system.

Other than the above-described configuration, the fuel cell system according to Embodiment 4 may be configured in the same manner as the fuel cell system according to any one of Embodiment 1, Embodiment 2, Embodiment 3, and the variations thereof. Since the apparatus configuration of the fuel cell system according to Embodiment 4 may be the same as that of the fuel cell system 100 shown in FIG. 1, the components of the fuel cell system according to Embodiment 4 are denoted by the same reference signs and names as those used in FIG. 1, and a description of such common components is omitted.

Figure 11:
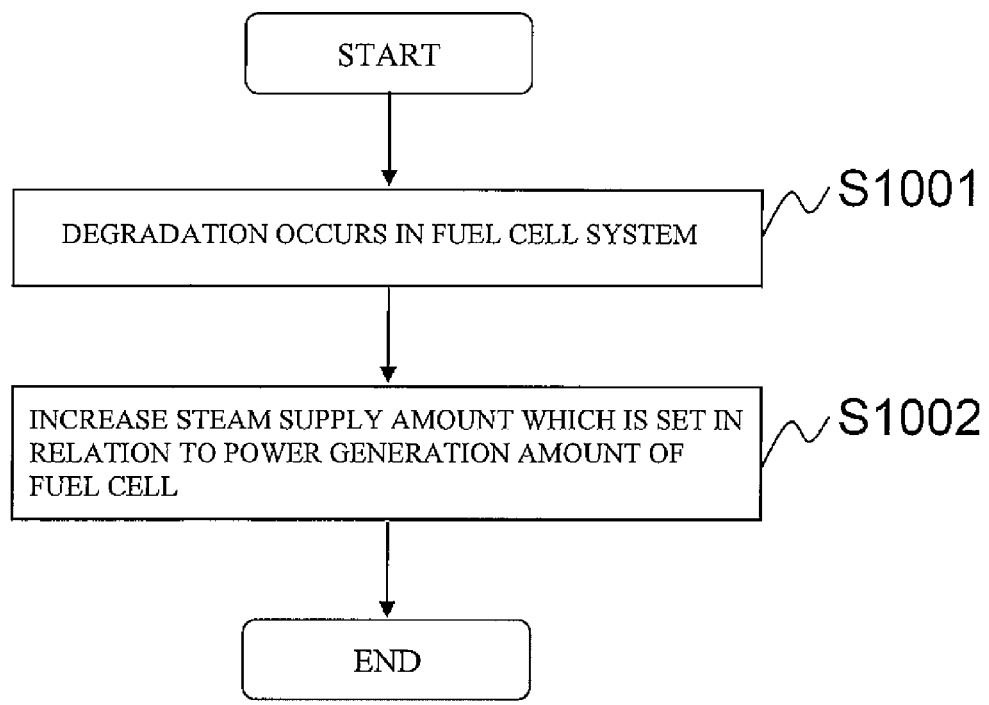
FIG. 11 is a flowchart showing an example of a method of operating a fuel cell system according to Embodiment 4.

FIG. 11 is a flowchart showing an example of a method of operating the fuel cell system according to Embodiment 4. Hereinafter, the method of operating the fuel cell system according to Embodiment 4 is described with reference to FIG. 11.

After the fuel cell system has started a power generation operation (START), if degradation occurs in the fuel cell system (step S1001), the controller 10 increases the steam supply amount to the reformer 1, which is set in relation to the amount of electric power generated by the fuel cell 7 (step S1002). Thereafter, the operation of the fuel cell system is ended (END).

It should be noted that, in the above description, control to be performed while the fuel cell system is performing power generation is described. However, even before the fuel cell system performs the power generation, the above-described control may be performed if degradation of the fuel cell system has occurred while the hydrogen-containing gas discharged from the fuel cell 7 is being combusted by the combustor 6 and thereby the reformer 1 is being heated. That is, the above-described control may be performed at any timing, so long as the control is performed while the hydrogen-containing gas discharged from the fuel cell 7 is being combusted by the combustor 6 and thereby the reformer 1 is being heated.

It should be noted that, in the above-described fuel cell systems according to the respective embodiments and variations, the raw material supply amount, the water supply amount, the target temperature of the reformer, etc., are suitably set in accordance with, for example, the reforming catalyst and the configuration of the reformer.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The fuel cell system and the method of operating the same according to the present invention are useful as a fuel cell system and a method of operating the same that are capable of performing relatively stable operation even if the composition of the raw material has changed.

REFERENCE SIGNS LIST 1 reformer
2 raw material supply device
3 water feeder
4 evaporator
5 temperature detector
6 combustor
7 fuel cell
8 hydrogen-containing gas supply passage
9 hydrogen-containing gas discharge passage
10 controller

The invention claimed is:
1. A fuel cell system comprising:
  a reformer configured to generate a hydrogen-containing gas through a reforming reaction by using a raw material and steam;

a raw material supply device configured to supply the raw material to the reformer;

a steam supply device configured to supply the steam to the reformer;

a temperature detector configured to detect a temperature of the reformer;

a fuel cell configured to generate electric power by using the hydrogen-containing gas;

a combustor configured to combust the hydrogen-containing gas discharged from the fuel cell to heat the reformer; and a controller configured to, while controlling the raw material supply device such that the temperature detected by the temperature detector becomes a target temperature, control the steam supply device in accordance with a change in a composition of the raw material, such that a change rate of a steam supply amount to the reformer becomes less than a change rate of a raw material supply amount to the reformer.

2. The fuel cell system according to claim 1, wherein the controller, when increasing the raw material supply amount to the reformer while controlling the raw material supply device such that the temperature detected by the temperature detector becomes the target temperature, controls the steam supply device such that an increasing rate of the steam supply amount to the reformer becomes less than an increasing rate of the raw material supply amount to the reformer.

3. The fuel cell system according to claim 1, wherein the controller, when increasing the raw material supply amount to the reformer while controlling the raw material supply device such that the temperature detected by the temperature detector becomes the target temperature, controls the steam supply device such that a decreasing rate of the steam supply amount to the reformer becomes less than an increasing rate of the raw material supply amount to the reformer.

4. The fuel cell system according to claim 1, wherein the controller, when decreasing the raw material supply amount to the reformer while controlling the raw material supply device such that the temperature detected by the temperature detector becomes the target temperature, controls the steam supply device such that a decreasing rate of the steam supply amount to the reformer becomes less than a decreasing rate of the raw material supply amount to the reformer.

5. The fuel cell system according to claim 1, wherein the controller, when decreasing the raw material supply amount to the reformer while controlling the raw material supply device such that the temperature detected by the temperature detector becomes the target temperature, controls the steam supply device such that an increasing rate of the steam supply amount to the reformer becomes less than a decreasing rate of the raw material supply amount to the reformer.

6. The fuel cell system according to claim 1, wherein the controller, while controlling the raw material supply device such that the temperature detected by the temperature detector becomes the target temperature, controls the steam supply device such that the steam supply amount to the reformer becomes a value that is set in accordance with an amount of electric power generated by the fuel cell.

7. The fuel cell system according to claim 6, wherein the controller, when increasing the raw material supply amount to the reformer while controlling the raw material supply device such that the temperature detected by the temperature detector becomes the target temperature, controls the steam supply device such that the steam supply amount to the reformer becomes a value that is set in accordance with an amount of electric power generated by the fuel cell.

8. The fuel cell system according to claim 6, wherein the controller, when decreasing the raw material supply amount to the reformer while controlling the raw material supply device such that the temperature detected by the temperature detector becomes the target temperature, controls the steam supply device such that the steam supply amount to the reformer becomes a value that is set in accordance with an amount of electric power generated by the fuel cell.

9. The fuel cell system according to claim 1, wherein the controller:

controls the raw material supply device such that the temperature detected by the temperature detector becomes the target temperature; and based on such a raw material supply amount to the reformer as to cause the temperature detected by the temperature detector to become the target temperature, updates the raw material supply amount to the reformer, the raw material supply amount being set in advance in relation to an amount of electric power generated by the fuel cell.

10. The fuel cell system according to claim 6, wherein the controller controls the steam supply device, such that the steam supply amount to the reformer, the steam supply amount being set in relation to an amount of electric power generated by the fuel cell, increases in accordance with degradation of the fuel cell system.

11. A method of operating a fuel cell system, comprising:

generating, by a reformer, a hydrogen-containing gas by using a raw material and steam;

generating, by a fuel cell, electric power by using the hydrogen-containing gas;

heating the reformer by combusting the hydrogen-containing gas discharged from the fuel cell;

detecting a temperature of the reformer;

controlling a raw material supply amount to the reformer such that the detected temperature of the reformer becomes a target temperature; and while controlling the raw material supply amount to the reformer such that the detected temperature of the reformer becomes the target temperature, controlling a steam supply amount to the reformer in accordance with a change in a composition of the raw material, such that a change rate of the steam supply amount to the reformer becomes less than a change rate of the raw material supply amount to the reformer.

* * * * *